3,562,257
BENZOTHIAZEPINE DERIVATIVES

Hiroshi Kugita and Hirozumi Inoue, Tokyo-to, and Muneyoshi Ikezaki and Satoshi Takeo, Oomiya-shi, Japan, assignors to Tanabe Seiyaku Co., Ltd., Osaka, Japan, a corporation of Japan
No Drawing. Filed Oct. 17, 1968, Ser. No. 768,550
Claims priority, application Japan, Oct. 28, 1967, 42/69,545, 42/69,546; June 17, 1968, 43/41,789, 43/41,790, 43/41,791
Int. Cl. C07d 43/40
U.S. Cl. 260—239.3                                43 Claims

ABSTRACT OF THE DISCLOSURE

Benzothiazepine derivatives of the formula:

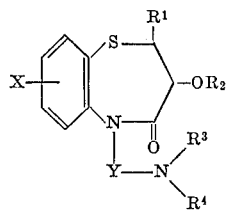

wherein $R^1$ is a phenyl group which may be substituted with 1 to 3 lower alkyl groups, lower alkoxy groups or halogen atoms, $R^2$ is a hydrogen atom or a lower alkanoyl group, $R^3$ and $R^4$ are each a lower alkyl group, X is a hydrogen atom or a halogen atom and Y is an alkylene group of 2 or 3 carbon atoms, and their non-toxic acid-addition salts. The compounds are useful as antidepressants, tranquilizers and coronary vasodilators.

---

This invention relates to novel benzothiazepine derivatives and preparation thereof.

The said benzothiazepine derivatives are representable by the formula:

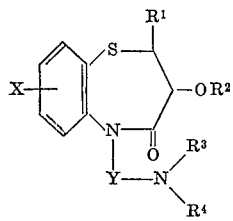

[I]

wherein $R^1$ is a phenyl group which may be substituted with 1 to 3 lower alkyl groups (e.g. methyl, ethyl, propyl, isopropyl, butyl), lower alkoxy groups (e.g. methoxy, ethoxy, propoxy, isopropoxy, butoxy) or halogen atoms (e.g. chlorine, bromine), $R^2$ is a hydrogen atom or a lower alkanoyl group (e.g. acetyl, propionyl, butyryl), $R^3$ and $R^4$ are each a lower alkyl group (e.g. methyl, ethyl, propyl, isopropyl, butyl), X is a hydrogen atom or a halogen atom (e.g. chlorine, bromine, etc.), and Y is an alkylene group of 2 or 3 carbon atoms (e.g. trimethylene, propylene). The term "lower" used in conjunction with an atomic group is intended to mean one having no more than 8 carbon atoms.

Hitherto, it has been reported that thiazesim (i.e. 2-phenyl-5-($\beta$ - dimethylaminoethyl) - 2,3 - dihydro-1,5-benzothiazepin-4(5H)-one) has an antidepressive action [cf. Freeman et al.: Current Therapeutic Research, 7, 655 (1965); Berry et al.: British Journal Psychiat., 114, 203 (1968); Krapcho et al.: J. Medical Chemistry, 9, 191 (1966)]. It has now been found that the benzothiazepine derivatives [I] have an antidepressive activity nearly equal to that of thiazesim but with remarkably less toxicity. Particularly, the following compounds are excellent antidepressants compared with thiazesim in respect to the relative ratio of the maximum toxic dose (hereinafter referred to as "MTD") (intraperitoneal injection)/antidepressive activity:

2-(4-methylphenyl)-3-hydroxy-5-($\beta$-dimethylaminoethyl)-2,3-dihydro-1,5-benzothiazepin-4(5H)-one (hydrochloride),
2-(4-methoxyphenyl)-3-hydroxy-5-($\beta$-dimethylaminoethyl)-7-chloro-2,3-dihydro-1,5-benzothiazepin-4(5H)-one (hydrochloride),
2,(4-chlorophenyl)-3-hydroxy-5-($\beta$-dimethylaminoethyl)-7-chloro-2,3-dihydro-1,5-benzothiazepin-4-(5H)-one (hydrochloride),
2-(4-methoxyphenyl)-3-hydroxy-5-($\beta$-dimethylaminoethyl)-2,3-dihydro-1,5-benzothiazepin-4(5H)-one (hydrobromide),
2-(4-methoxyphenyl)-3-hydroxy-5-($\gamma$-dimethylamino-n-propyl)-7-chloro-2,3-dihydro-1,5-benzothiazepin-4(5H)-one (hydrochloride), etc.

It was also ascertained by the rotor-rod test that the motor-coordinating effect of the benzothiazepine derivatives [I] on mice is nil or significantly weaker than that of thiazesim.

Moreover, the benzothiazepine derivatives [I] have a potent tranquilizer action, some of which are comparable to or better than chlordiazepoxide. Particularly, the following compounds are apparently better than chlordiazepoxide with respect to the tranquilizer activity and the relative ratio of MTD/tranquilizer activity: 2-(4-methylphenyl) - 3 -hydroxy-5-($\beta$-dimethylaminoethyl)-2,3-dihydro - 1,5 - benzothiazepin - 4(5H) - one (hydrochloride), 2 - (4 - methoxyphenyl)-3-hydroxy-5-($\beta$-dimethylaminoethyl) - 7 - chloro-2,3-dihydro-1,5-benzothiazepin-4(5H)-one (hydrochloride), etc. The above described properties are characteristic of the benzothiazepine derivatives [I]. Thiazesim is known to possess substantially no tranquilizer action.

Furthermore, the benzothiazepin derivatives [I] show a coronary vasodilating action stronger than that of papaverine. Some of them, e.g. 2-(4 - methoxyphenyl)-3-acetoxy - 5 - ($\beta$ - dimethylaminoethyl)-2,3-dihydro-1,5-benzothiazepin - 4(5H) - one (hydrochloride), exhibit such a high potency as nearly equal to or more than dipyridamole (i.e. 2,6 - di[di(2 - hydroxyethyl)amino]-4,8-dipiperidinopyrimido[5,4-d]pyrimidine).

The toxicity of the benzothiazepine derivatives [I] is relatively low. For instance, the acute toxicity of 2-(4-methoxyphenyl)-3-acetoxy - 5 - ($\beta$-dimethylaminoethyl)-2,3-dihydro-1,5-benzothiazepin - 4(5H) - one (hydrochloride) when administered to mice is $LD_{50}$=about 70 mg./kg. (intravenous route) or about 1000 mg./kg. (oral route).

Thus, the benzothiazepine derivatives [I] and their non-toxic acid-addition salts are useful as antidepressants, tranquilizers and coronary vasodilators. Their unit dosages or therapeutically effective quantities can vary over a wide range, for instance, from about 0.5 to about 500 mg. depending on the age of the patient, the degree of therapeutic effect desired, the kind of therapeutic activity required and the like. In general, however, a suitable daily dose of the benzothiazepine derivative [I] or its non-toxic acid-addition salt for human adults may be from about 100 to 400 mg., when used as an antidepressant or a tranquilizer. In cases where its effect as a coronary vasodilator is desired, the dose may be considerably reduced. For instance, the presently most potent compound, i.e. 2-(4-methoxyphenyl)-3-acetoxy-5-(β-dimethylaminoethyl) - 2,3 - dihydro-1,5-benzothiazepin-4(5H)-one, is effective for amelioration of acute or chronic coronary symptom such as coronary insufficiency, angina pectoris or cardiac infarction at a daily dose of about 10 mg. by intravenous route or of about 30 to about 60 mg. by oral route for human adult. At such doses the paroxysm of angina pectoris may be prevented effectively.

According to the present invention, the novel benzothiazepine derivatives [I] can be prepared by reacting an alkali metal salt of the compound represented by the formula:

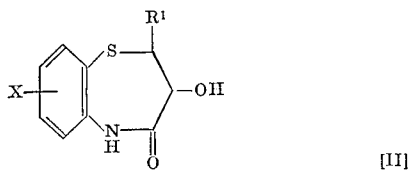

wherein $R^1$ and X are each as defined above with an aminoalkyl halide represented by the formula:

wherein $R^3$, $R^4$ and Y are each as defined above and Z is a halogen atom (e.g. chlorine, bromine) and if desired, acylating in a conventional manner the resultant compound represented by the formula:

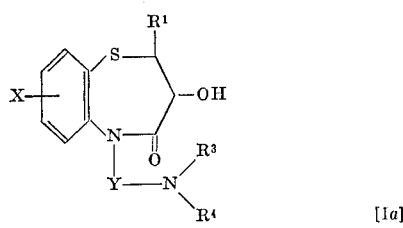

wherein $R^1$, $R^3$, $R^4$, X and Y are each as defined above.

The starting compound [II] is readily obtainable, for instance, by condensing at an elevated temperature a 2-aminothiophenol which may have a halogen atom on the benzene ring, with an epoxyalkanoic ester of the formula:

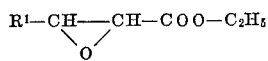

wherein $R^1$ is as defined above. Preferred examples of the compound [II] are as follows:

2-phenyl-3-hydroxy-2,3-dihydro-1,5-benzothiazepin-4(5H)-one,
2-(4-methylphenyl)-3-hydroxy-2,3-dihydro-1,5-benzothiazepin-4(5H)-one,
2-(4-methoxyphenyl)-3-hydroxy-2,3-dihydro-1,5-benzothiazepin-4(5H)-one,
2-(2,4-dimethoxyphenyl)-3-hydroxy-2,3-dihydro-1,5-benzothiazepin-4(5H)-one,
2-(3,4,5-trimethoxyphenyl)-3-hydroxy-2,3-dihydro-1,5-benzothiazepin-4(5H)-one,
2-(4-chlorophenyl)-3-hydroxy-2,3-dihydro-1,5-benzothiazepin-4(5H)-one,
2-(2,4-dichlorophenyl)-3-hydroxy-2,3-dihydro-1,5-benzothiazepin-4(5H)-one,
2-phenyl-3-hydroxy-7-chloro-2,3-dihydro-1,5-benzothiazepin-4(5H)-one,
2-(4-methylphenyl)-3-hydroxy-7-chloro-2,3-dihydro-1,5-benzothiazepin-4(5H)-one,
2-(4-methoxyphenyl)-3-hydroxy-7-chloro-2,3-dihydro-1,5-benzothiazepin-4(5H)-one,
2-(2,4-dimethoxyphenyl)-3-hydroxy-7-chloro-2,3-dihydro-1,5-benzothiazepin-4(5H)-one,
2-(3,4,5-trimethoxyphenyl)-3-hydroxy-7-chloro-2,3-dihydro-1,5-benzothiazepin-4(5H)-one,
2-(4-chlorophenyl)-3-hydroxy-7-chloro-2,3-dihydro-1,5-benzothiazepin-4(5H)-one,
2-(2,4-dichlorophenyl)-3-hydroxy-7-chloro-2,3-dihydro-1,5-benzothiazepin-4(5H)-one, etc.

Prior to subjecting the compound [II] to the reaction in the process of this invention, said compound is converted into its alkali metal salt, for instance, by treating with an alkali metal (e.g. sodium, potassium, etc.); an alkali metal hydride (e.g. sodium hydride, potassium hydride, etc.) or an alkali metal amide (e.g. sodium amide, potassium amide, etc.). The reaction is carried out in a solvent (e.g. dioxane, toluene, xylene, dimethylsulfoxide), usually at a temperature from about 20 to 40° C. for about an hour.

The alkali metal salt of the compound [II] thus prepared is then reacted with the aminoalkyl halide [III]. The alkali metal salt which was produced in the reaction mixture described above can be used by itself in the reaction with the aminoalkyl halide or it can be reacted together with the solvent used in the alkali metal salt preparation. The reaction may be carried out at room temperature but a temperature of about 40 to 80° C. with a reaction time of 1 to 6 hours is preferred.

The acylation of the compound [Ia] thus produced is an optional step and may be carried out by a conventional procedure. For instance, the compound [Ia], is treated with a lower alkanoic acid (e.g. acetic acid, propionic acid, butyric acid) in the presence of a dehydrating agent (e.g. polyphosphoric acid, phosphoric anhydride, conc. sulfuric acid) or with a reactive derivative of a lower alkanoic acid such as a lower alkanoic anhydride (e.g. acetic anhydride, propionic anhydride) or a lower alkanoyl halide (e.g. acetyl chloride, acetyl bromide, propionyl chloride, butyryl chloride, capropyl chloride). When the acylating agent is a lower alkanoyl halide, the presence of a base (e.g. pyridine, triethylamine, dimethylaniline) in the reaction system is preferred. The acylation is normally effected at room temperature or elevated temperature for a sufficient period of time. The resulting product in the acylation is represented by the formula:

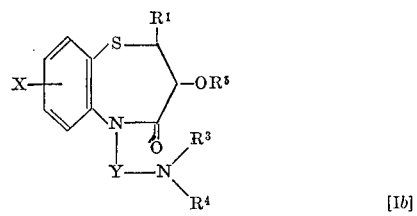

wherein $R^1$, $R^3$, $R^4$, X and Y are each as defined above and $R^5$ is a lower alkanoyl group (e.g. acetyl, propionyl, butyryl, etc.).

The thus obtained benzothiazepine derivative [I], i.e. the compound [Ia] or the compound [Ib], can be converted into its acid-addition salts by treatment with an organic or inorganic acid (e.g. acetic acid, oxalic acid, malonic acid, tartaric acid, malic acid, citric acid, lactic acid, gluconic acid, aspartic acid, hydrochloric acid, hydrobromic acid, sulfuric acid, nitric acid, perchloric acid) in a suitable solvent (e.g. water, methanol, ethanol).

For medicinal purposes the benzothiazepine derivatives [I] and their non-toxic acid-addition salts may be employed in the form of pharmaceutical preparations, which contain them in admixture with a pharmaceutical organic or inorganic carrier material suitable for enteral or parenteral applications. Oral administration by the use of tablets, capsules, powders or in liquid form such as suspensions, solutions, emulsions or syrups is particularly advantageous. When formed into tablets, conventional excipients (e.g. sodium citrate, lactose, microcrystalline cellulose, starch), lubricating agents (e.g. anhydrous silicic acid, hydrized castor oil, magnesium stearate, sodium lauryl sulfate, talc) and binding agents (e.g. starch paste, glucose, lactose, gum acacia, gelatin, mannitol, magnesium trisilicate, talc) can be used. When administered as liquids, conventional liquid carriers can be employed. In the case of solid preparations, each unit dosage form of the active ingredient can contain from about 5 to 95% of same by weight based on the entire composition with the remainder comprising conventional pharmaceutical carriers. When the therapeutic agent is used as an aqueous solution, i.e. injection, the solution may contain about 0.05 to 0.5% of same by weight based on the entire solution.

Practical and presently-preferred embodiments of the present invention are illustratively shown in the following examples.

EXAMPLE 1

0.6 g. of 43.9% sodium hydride was added to 13 ml. of dimethylsulfoxide and the resulting mixture was stirred for an hour at 60° C. under nitrogen atmosphere. After the addition of 0.9 g. of 2-(4-chlorophenyl)-3-hydroxy-2,3-dihydro-1,5-benzothiazepin-4(5H)-one, the resultant mixture was stirred for an hour at room temperature.

A solution of 0.5 g. of β-dimethylaminoethyl chloride in 3 ml. of dimethylsulfoxide was added dropwise to the mixture, and the resulting mixture was heated at 60° C. for an hour. The reaction mixture was then poured into ice water and extracted with ether. The ethereal layer was extracted with 10% hydrochloric acid. The aqueous layer was made alkaline with potassium carbonate and once again extracted with ether. The ether layer was dried and evaporated to remove ether thereby producing 0.76 g. of crystals. After recrystallization of the crystals from ethanol, 0.65 g. of 2-(4-chlorophenyl) - 3 - hydroxy-5-(β-dimethylaminoethyl) - 2,3 - dihydro - 1,5 - benzothiazepin-4(5H)-one was obtained having a melting point from 108 to 110° C. The product was dissolved in ether and hydrogen chloride gas was bubbled into the solution. The resultant hydrochloride was recrystallized from ethanol whereby crystals with a melting point from 215 to 217° C. were obtained.

EXAMPLE 2

0.6 g. of 43.9% sodium hydride was added to 13 ml. of dimethylsulfoxide and the resulting mixture was stirred for an hour at 60° C. under nitrogen atmosphere. After the addition of 1.5 g. of 2-(4-methylphenyl)-3-hydroxy-2,3-dihydro - 1,5 - benzothiazepin - 4(5H)-one at room temperature, the mixture was stirred at the same temperature for an hour.

A solution of 0.74 g. of β-dimethylaminoethyl chloride in 3 ml. of dimethylsulfoxide was added dropwise to the resulting mixture. The mixture was then heated at 50° C. for 50 minutes. The reaction mixture was treated as in Example 1 thereby producing 1.68 g. of 2-(4-methylphenyl) - 3 - hydroxy - 5 - (β - dimethylaminoethyl)-2,3-dihydro-1,5-benzothiazepin-4(5H)-one as an oil. The oil was dissolved in ether and hydrogen chloride gas was bubbled into the solution. The resultant hydrochloride was recrystallized from methanol whereby 1.13 g. of crystals, having a melting point from 238 to 241° C., was obtained.

EXAMPLE 3

0.6 g. of 2-(4-methoxyphenyl)-3-hydroxy-7-chloro-2,3-dihydro-1,5-benzothiazepin - 4(5H) - one was added at room temperature to a reaction mixture of 98 mg. of 43.9% sodium hydride and 10 ml. of dimethylsulfoxide. After stirring at room temperature for 30 minutes, a solution of 0.23 g. of β-dimethylaminoethyl chloride in 2 ml. of dimethylsulfoxide was added dropwise to the mixture and the resultant mixture was heated for 1.5 hours at 45 to 50° C. The reaction mixture was treated as in Example 1 thereby producing 550 mg. of crude free base of 2-(4-methoxyphenyl)-3-hydroxy - 5 - (β-dimethylaminoethyl)-7-chloro - 2,3 - dihydro - 1,5-benzothiazepin-4(5H)-one. The base was crystallized by adding a small quantity of ether, and the resultant crystals were collected by filtration to give 320 mg. of the free base having a melting point from 145 to 147° C. The free base was converted into its hydrochloride as in Example 1. When recrystallized from ethanol 310 mg. of the hydrochloride as crystals were obtained having a melting point from 217 to 220° C.

EXAMPLE 4

1.5 g. of 2-(4-chlorophenyl) - 3 - hydroxy-7-chloro-2,3-dihydro-1,5-benzothiazepin-4(5H)-one was added to the reaction mixture of 0.24 g. of 43.9% sodium hydride and 15 ml. of dimethylsulfoxide at room temperature. After stirring at room temperature for one hour, a solution of 0.61 g. of β-dimethylaminoethyl chloride in 3 ml. of dimethylsulfoxide was added dropwise to the mixture and then heated at 50° C. for an hour. The reaction mixture was treated as in Example 1 thereby producing 1.24 g. of 2-(4-chlorophenyl) - 3 - hydroxy-5-(β-dimethylaminoethyl) - 7 - chloro - 2,3 - dihydro-1,5-benzothiazepin - 4 (5H)-one hydrochloride. Melting point 194 to 197° C. (recrystallized from a mixture of ethanol and ether).

In the same manner as described in Example 1, the following compounds were obtained: 2-(3,4,5 - trimethoxyphenyl) - 3 - hydroxy-5(β-dimethylaminoethyl) - 7-chloro-2,3-dihydro - 1,5 - benzothiazepin - 4(5H) - one perchlorate, melting point 145 to 150° C. (recrystallized from ethanol); 2-(4-methylphenyl) - 3 - hydroxy-5(β-dimethylaminoethyl) - 7 - chloro - 2,3 - dihydro-1,5-benzothiazepin-4(5H)-one hydrochloride, melting point 178 to 180° C. (recrystallized from ethanol); 2-(2,4-dichlorophenyl) - 3 - hydroxy - 5 - (β-dimethylaminoethyl)-7-chloro - 2,3 - dihydro - 1,5 - benzothiazepin-4(5H)-one hydrochloride, melting point 217 to 219° C. (recrystallized from ethanol), etc.

EXAMPLE 5

0.3 g. of 43.9% sodium hydride was added to a solution of 1.5 g. of 2-phenyl-3-hydroxy-2,3-dihydro-1,5-benzothiazepin-4(5H)-one in 25 ml. of dioxane, at 25° C. The mixture was stirred at the room temperature for one hour and at about 40° C. for 30 minutes. A solution of 0.87 g. of β-dimethylaminoethyl chloride in 5 ml. of dioxane was added dropwise to the mixture at 20° C. The resultant mixture was then stirred at 55 to 65° C. for 5 hours. The reaction mixture was evaporated under reduced pressure to remove the solvent. The residue was dissolved in chloroform and extracted with 10% hydrochloric acid. The aqueous layer was made alkaline with potassium carbonate and extracted with ether. The ethereal layer was washed with water, dried and evaporated to remove ether thereby producing 500 mg. of crystals, which were recrystallized from ethanol to give 460 mg. of 2-phenyl - 3 - hydroxy - 5 - (β-dimethylaminoethyl)-2,3-dihydro - 1,5 - benzothiazepin-4(5H)-one having a melting point from 123 to 124° C. Hydrochloride, melting point 215 to 218° C. (recrystallized from ethanol).

EXAMPLE 6

0.55 g. of 43.9% sodium hydride was added to a solution of 3.0 g. of 2-(4-methoxyphenyl)-3-hydroxy-2,3-dihydro - 1,5 - benzothiazepin-4(5H)-one in 60 ml. of dioxane, at room temperature. The mixture was stirred at room temperature for 1.5 hours. A solution of 1.46 g. of β-dimethylaminoethyl chloride in 8 ml. of dioxane was added dropwise to the mixture at 20° C. and then stirred for 6 hours at 60° C. The reaction mixture was treated as described in Example 5. The resultant crystals were recrystallized from ethanol to give 0.46 g. of 2-(4-methoxyphenyl) - 3 - hydroxy - 5 - (β-dimethylaminoethyl) - 2,3-dihydro-1,5-benzothiazepin-4(5H)one, having a melting point from 105 to 107° C. Hydrochloride, melting point 225 to 228° C. (recrystallized from ethanol).

In the same manner as described in Example 5, the following compounds were obtained: 2-(3,4-dimethoxyphenyl) - 3 - hydroxy - 5 - (β-dimethylaminoethyl)-2,3-dihydro - 1,5 - benzothiazepin - 4(5H)-one hydrochloride, melting point 149 to 151° C. (recrystallized from ethanol); 2-(3,4,5-trimethoxyphenyl) - 3 - hydroxy - 5 - (β-dimethylaminoethyl) - 2,3 - dihydro - 1,5 - benzothiazepin-4(5H)-one hydrobromide, melting point 179 to 180° C. (recrystallized from a mixture of ethanol and ether); 2-(2,4-dichlorophenyl) - 3 - hydroxy - 5 - (β-dimethylaminoethyl) - 2,3 - dihydro - 1,5 - benzothiazepin - 4(5H) - one hydrochloride, melting point 215 to 217° C. (recrystallized from ethanol); 2-phenyl-3-hydroxy-5-(β-dimethylaminoethyl) - 7 - chloro - 2,3 - dihydro - 1,5 - benzothiazepin-4(5H)-one hydrochloride, melting point 228 to 230° C. (recrystallized from methanol); 2 - (3,4 - dimethoxyphenyl) - 3 - hydroxy - 5 - (β-dimethylaminoethyl) - 7-chloro - 2,3 - dihydro - 1,5 - benzothiazepin - 4(5H) - one hydrochloride, melting point 154 to 156° C. (recrystallized from ethanol), etc.

EXAMPLE 7

A mixture of 0.6 g. of 43.9% sodium hydride and 30 ml. of dimethylsulfoxide was stirred for one hour at 60° C. under nitrogen atmosphere. 3 g. of 2-phenyl-3-hydroxy-2,3-dihydro - 1,5 - benzothiazepin-4(5H)-one was added to the mixture at room temperature and stirred for one hour at 25 to 28° C. A solution of 1.75 g. of γ-dimethylamino-n-propyl chloride in 5 ml. of dimethylsulfoxide was added dropwise to the mixture, and the mixture was then heated at 50 to 53° C. for 70 minutes. The reaction mixture was then poured into ice water and extracted with chloroform. The chloroform layer was extracted with 10% hydrochloric acid. The aqueous layer was made alkaline with potassium carbonate and extracted again with chloroform. The chloroform layer was dried and evaporated to remove the solvent producing 3.0 g. of 2-phenyl-3-hydroxy-5-(γ-dimethylamino-n-propyl) - 2,3 - dihydro - 1,5 - benzothiazepin-4(5H)-one having a melting point at 103 to 104° C. The product was dissolved in ether and hydrogen chloride gas was bubbled into the solution. The resulting hydrochloride was recrystallized from ethanol to give crystals having a melting point at 198 to 199° C.

In the same manner as described in Example 7, the following compounds were obtained: 2 - (4 - methoxyphenyl) - 3 - hydroxy - 5 - (γ-dimethylamino-n-propyl)-2,3 - dihydro - 1,5 - benzothiazepin-4(5H)-one hydrochloride, melting point 151 to 156° C. (recrystallized from a mixture of ethanol and ether); 2-(3,4,5-trimethoxyphenyl) - 3 - hydroxy-5-(γ-dimethylamino-n-propyl) - 2,3 - dihydro - 1,5 - benzothiazepin-4(5H)-one hydrochloride, melting point 187 to 188° C. (recrystallized from a mixture of ethanol and acetone); 2-(4-methylphenyl) - 3 - hydroxy - 5 - (γ-dimethylamino-n-propyl)-2,3 - dihydro - 1,5 - benzothiazepin-4(5H)-one hydrochloride, melting point 212 to 213° C. (recrystallized from ethanol); 2-phenyl - 3 - hydroxy - 5 - (γ-dimethylamino-n-propyl) - 7 - chloro - 2,3 - dihydro - 1,5 - benzothiazepin-4(5H)-one oxalate, melting point 126 to 128° C. (recrystallized from a mixture of methanol and ethanol); 2-(4-chlorophenyl) - 3 - hydroxy - 5 - (γ-dimethylamino-n-propyl) - 7 - chloro - 2,3 - dihydro - 1,5 - benzothiazepin - 4(5H) - one hydrochloride, melting point 229.5 to 230.5° C. (recrystallized from ethanol); 2-(4-methoxyphenyl) - 3 - hydroxy - 5 (α-methyl-β-dimethylaminoethyl) - 2,3 - dihydro - 1,5 - benzothiazepin-4(5H)-one oxalate, melting point 189 to 190° C. (recrystallized from ethanol), etc.

EXAMPLE 8

A mixture of 0.65 g. of 43.9% sodium hydride and 40 ml. of dimethylsulfoxide was stirred at 60° C. for an hour under nitrogen atmosphere, and 4 g. of 2-(4-methoxyphenyl) - 3 - hydroxy-7-chloro-2,3-dihydro-1,5-benzothiazepin-4(5H)-one were then added at room temperature. The resulting mixture was stirred at room temperature for 40 minutes and then at 40 to 45° C. for 20 minutes. A solution of 1.88 g. of γ-dimethylamino-n-propyl chloride in 5 ml. of dimethyl-sulfoxide was added dropwise to the mixture followed by stirring at room temperature for one hour and at 50 to 55° C. for one hour. The reaction mixture was treated as described in Example 7 producing 4.4 g. of crude free base of 2-(4-methoxyphenyl) - 3 - hydroxy-5-(γ - dimethylamino-n-propyl)-7-chloro-2,3-dihydro-1,5-benzothiazepin - 4(5H)-one as a viscous substance. The product was dissolved in ether and hydrogen chloride gas was bubbled into the solution. The resulting hydrochloride was recrystallized from a mixture of ethanol and ether to give 3.56 g. of crystals having a melting point from 221 to 225° C.

EXAMPLE 9

A mixture of 2 g. of 2-phenyl-3-hydroxy-5-(β-dimethylaminoethyl)-2,3-dihydro-1,5-benzothiazepin-4(5H) - one and 20 ml. of acetic anhydride was heated on a water bath for 4 hours. The reaction mixture was evaporated under reduced pressure to remove acetic anhydride. The residue was mixed with ice water and made alkaline with sodium bicarbonate. The precipitated crystals were collected by filtration to obtain 2.0 g. of 2-phenyl-3-acetoxy-5-(β-dimethylaminoethyl) - 2,3 - dihydro-1,5-benzothiazepin-4(5H)-one. Hydrobromide, melting point 215 to 217° C. (recrystallized from a mixture of ethanol and acetone).

EXAMPLE 10

0.6 g. of caproyl chloride was added while stirring under cooling to a solution of 1.4 g. of 2-phenyl-3-hydroxy-5 - (β-dimethylaminoethyl)-2,3-dihydro-1,5-benzothiazepin-4(5H)-one in 5 ml. of pyridine. After preservation for 2 days in a refrigerator, the reaction mixture was poured into ice water and extracted with chloroform. The chloroform layer was washed with water, dried and evaporated to remove the solvent. The residue was dissolved in ethanol and 60% perchloric acid was added thereto. The precipitate was collected by filtration and recrystallized from ethanol to give 550 mg. of 2-phenyl-3-pentylcarbonyloxy - 5-(β-dimethylaminoethyl)-2,3-dihydro-1,5-benzothiazepin - 4(5H) - one perchlorate having a melting point from 137 to 139° C. (recrystallized from ethanol).

EXAMPLE 11

A mixture of 1.5 g. of 2-(4-methoxyphenyl)-3-hydroxy-5-(β-dimethylaminoethyl) - 2,3-dihydro-1,5-benzothiazepin-4-(5H)-one and 20 ml. of acetic anhydride was heated on a water bath for 5 hours. The reaction mixture was evaporated under reduced pressure to remove acetic anhydride and the concentrated product was poured into ice water. The resulting mixture was made alkaline with sodium bicarbonate and extracted with chloroform. The chloroform layer was dried and evaporated to remove the solvent. The residue was dissolved in acetone, and an ethanol solution containing hydrogen chloride was added thereto producing 1.53 g. of 2-(4-methoxyphenyl)-3-acetoxy-5-(β-dimethylaminoethyl) - 2,3 - dihydro-1,5-benzothiazepin-4(5H)-one hydrochloride having a melting point from 187 to 188° C. When recrystallized from a mixture of ethanol and ether, the melting point was raised to 187.5 to 188.5° C.

In the same manner as described in Example 11, the following compounds were obtained: 2-(3,4,5-trimethoxyphenyl)-3-acetoxy - 5 - (β-dimethylaminoethyl)-2,3-dihydro-1,5-benzothiazepin-4(5H)-one oxalate, melting point 117 to 119° C. (recrystallized from a mixture of ethanol and ether); 2-(4-methylphenyl)-3-acetoxy-5-(β-dimethylaminoethyl)-2,3-dihydro - 1,5-benzothiazepin-4(5H)-one hydrochloride, melting point 213 to 214° C. (recrystallized from a mixture of ethanol and ether); 4-phenyl-3-acetoxy-5-(β-dimethylaminoethyl)-7-chloro - 2,3-dihydro-1,5-benzothiazepin - 4(5H) - one hydrochloride, melting point 199 to 200° C. (recrystallized from a mixture of ethanol and ether); 2-(4-methoxyphenyl) - 3-acetoxy-5-(β-dimethylaminoethyl)-7-chloro-2,3 - dihydro-1,5-benzothiazepin-4(5H)-one hydrochloride, melting point 162 to 167° C. (recrystallized from a mixture of ethanol and ether); 2-(4-chlorophenyl) - 3-acetoxy-5-(β-dimethylaminoethyl) - 7 - chloro - 2,3 - dihydro-1,5-benzothiazepin-4(5H)-one hydrochloride, melting point 156 to 158° C. (recrystallized from a mixture of ethanol and ether), etc.

EXAMPLE 12

A mixture of 1.5 g. of 2-phenyl-3-hydroxy-5-(γ-dimethylamino-n-propyl)-2,3-dihydro - 1,5-benzothiazepin-4(5H)-one and 20 ml. of acetic anhydride was heated on a water bath for 5 hours. The reaction mixture was evaporated under reduced pressure to remove acetic anhydride, and water was added thereto. The resulting mixture was made alkaline with sodium bicarbonate and extracted with chloroform. The chloroform layer was dried and evaporated to remove the solvent. 1.67 g. of the resulting viscous substance was dissolved in acetone and an ethanol solution containing hydrogen chloride was added to the mixture. 1.53 g. of 2-phenyl-3-acetoxy-5-(γ-dimethylamino-n-propyl) - 2,3 - dihydro-1,5-benzothiazepin-4(5H)-one hydrochloride was obtained as prisms melting at 203 to 205° C. (recrystallized from a mixture of ethanol and ether).

In the same manner as described in Example 12, the following compounds were obtained: 2-(4-methylphenyl)-3-acetoxy-5 - (γ-dimethylamino-n-propyl) - 2,3-dihydro-1,5-benzothiazepin - 4(5H) - one hydrochloride, melting point 203 to 204.5° C. (recrystallized from a mixture of ethanol and ether); 2-(3,4,5 - trimethoxyphenyl)-3-acetoxy-5-(γ-dimethylamino-n-propyl)-2,3 - dihydro-1,5-benzothiazepin-4(5H)-one hydrochloride, melting point 136 to 139° C. (recrystallized from a mixture of acetone and ether); 2-phenyl-3-acetoxy - 5 - (γ-dimethylamino-n-propyl)-7-chloro-2,3-dihydro-1,5-benzothiazepin - 4(5H)-one hydrochloride, melting point 159 to 161° C. (recrystallized from a mixture of ethanol and ether); 2-(4-methoxyphenyl)-3-acetoxy-5 - (γ-dimethylamino - n - propyl)-7-chloro-2,3-dihydro-1,5-benzothiazepin - 4(5H)-one hydrochloride, melting point 169 to 170° C. (decomp.) (recrystallized from a mixture of ethanol, acetone and ether); 2-(4-chlorophenyl)-3-acetoxy - 5 - (γ-dimethylamino-n-propyl)-7-chloro-2,3 - dihydro-1,5-benzothiazepin-4(5H)-one hydrochloride, melting point 155 to 160° C. (recrystallized from a mixture of ethanol, acetone and ether), etc.

EXAMPLE 13

0.7 g. of propionyl chloride was added while stirring under cooling to a solution of 2.0 g. of 2-phenyl-3-hydroxy-5-(γ-dimethylamino-n-propyl)-2,3 - dihydro-1,5 - benzothiazepin-4(5H)-one in 6 ml. of pyridine. After stirring for 2 hours, 0.3 g. of propionyl chloride was added, and the resultant mixture was preserved in a refrigerator for 20 hours. The reaction mixture was poured into ice water and extracted with chloroform. The chloroform layer was dried and evaporated to remove the solvent. 2.17 g. of the resulting viscous substance was dissolved in acetone and 0.85 g. of methanesulfonic acid was added thereto. The precipitate was collected and recrystallized from a mixture of acetone and ethyl acetate to give 0.74 g. of 2-phenyl-3-propionyloxy-5-(γ-dimethylamino-n-propyl)-2,3 - dihydro-1,5-benzothiazepin-4(5H)-one methanesulfonate having a melting point from 132 to 133.5° C.

The antidepressive activity of the benzothiazepin derivatives [I] obtained in the above examples was evaluated by the depressive effect on septal-lesioned rats and is shown in Table 1 with their maximum toxic dose and the relative ratio of MTD/ED$_{50}$.

The tranquilizer activity of the benzothiazepin derivatives [I] was evaluated by the fighting-mouse method [Tedeschi et al.: J. Pharmacology & Experimental Therapeutics, 125, 28 (1959)] and is shown in Table 2.

The coronary vasodilating activity of the benzothiazepin derivatives [I] was evaluated by the Langendorff method using isolated hearts of guinea pigs and the coronary flow-increasing effect on dogs and is shown in Table 3.

TABLE 1

| Test compound—Formula | $R^1$ | $R^2$ | X | Y | $ED_{50}$ (mg./kg.) | MTD mg./kg. | MTD/ED$_{50}$ |
|---|---|---|---|---|---|---|---|
| | 4-chlorophenyl | H | H | —(CH$_2$)$_2$— | 42.04 | >100 | >2.38 |
| | 4-methylphenyl | H | H | Same | 35.35 | >300 | >8.48 |
| | 4-methoxyphenyl | H | Cl | do | 22.92 | 100 | 4.36 |
| | 3,4,5-trimethoxyphenyl | H | Cl | do | 106.06 | >300 | >2.82 |
| | 4-chlorophenyl | H | Cl | do | 32.42 | >300 | >9.25 |
| | 2,4-dichlorophenyl | H | Cl | do | 120.22 | >300 | >2.50 |
| | 4-methoxyphenyl | H | H | do | 45.05 | >300 | >6.66 |
| | 3,4-dimethylphenyl | H | H | do | ca. 62.5 | 100 | ca. 1.60 |
| | 3,4,5-trimethoxyphenyl | H | H | do | ca. 62.5 | 100 | ca. 1.60 |
| | 2,4-dichlorophenyl | H | H | do | ca. 62.5 | 100 | ca. 1.60 |
| | 3,4-dimethoxyphenyl | H | Cl | do | ca. 62.5 | 100 | ca. 1.60 |
| | Phenyl | H | H | —(CH$_2$)$_3$— | 44.54 | 100 | 2.24 |
| | 3,4,5-trimethoxyphenyl | H | H | Same | ca. 37.9 | 50 | ca. 1.32 |
| | 4-methylphenyl | H | H | do | ca. 37.9 | 100 | ca. 2.64 |
| | Phenyl | H | Cl | do | ca. 19.0 | 50 | ca. 2.63 |
| | 4-methoxyphenyl | H | Cl | do | 22.27 | 100 | 4.49 |
| | 4-chlorophenyl | H | Cl | do | ca. 37.9 | 100 | ca. 2.64 |
| | 4-methoxyphenyl | H | H | —CH(CH$_3$)CH$_2$— | ca. 113.8 | >300 | ca. >2.63 |
| | Phenyl | CH$_3$CO | H | —(CH$_2$)$_2$— | 27.26 | 100 | 3.67 |
| | 4-methoxyphenyl | CH$_3$CO | H | Same | ca. 75.8 | 100 | ca. 1.32 |
| | 4-methylphenyl | CH$_3$CO | H | do | ca. 75.8 | 100 | ca. 1.32 |
| | 4-methoxyphenyl | CH$_3$CO | Cl | do | ca. 50.0 | 100 | ca. 2.00 |
| | 4-chlorophenyl | CH$_3$CO | Cl | do | ca. 37.9 | 100 | ca. 2.64 |
| | Phenyl | CH$_3$CO | H | —(CH$_2$)$_3$— | ca. 25.0 | 100 | ca. 4.00 |
| | 4-methylphenyl | CH$_3$CO | H | Same | ca. 37.9 | 100 | ca. 2.64 |
| | Phenyl | CH$_3$CO | Cl | do | ca. 75.8 | 100 | ca. 1.32 |
| | 4-methoxyphenyl | CH$_3$CO | Cl | do | ca. 25.0 | 100 | ca. 4.00 |
| | Phenyl | C$_5$H$_{11}$CO | H | —(CH$_2$)$_2$— | ca. 120.2 | 300 | ca. 2.50 |
| Thiazesim | | | | | 27.51 | 30 | 1.09 |

Note.—Each of the test compounds was administered to septal-lesioned rats (Wister-male; body weight, about 200 g.) by intraperitoneal injection of one ml. per 100 g. body weight of the solution prepared by dissolving the compound into saline solution or 0.5% aqueous solution of carboxymethylcellulose. The tabulated value of ED$_{50}$ is the most effective one found within 2 hours after administration of the compound.

TABLE 2

| Test compound—Formula | R¹ | R² | X | Y | $ED_{50}$ (mg./kg.) | MTD (mg./kg.) | MTD/$ED_{50}$ |
|---|---|---|---|---|---|---|---|
| (structure shown below) | 4-chlorophenyl | H | H | —(CH₂)— | ca. 62.5 | >100 | ca. >2.64 |
| | 4-methylphenyl | H | H | Same as above | 38.25 | >300 | >7.85 |
| | 4-methoxyphenyl | H | Cl | ...do... | 22.92 | 100 | 4.15 |
| | 3,4,5-trimethoxyphenyl | H | Cl | ...do... | 107.5 | >300 | >2.79 |
| | 4-chlorophenyl | H | Cl | ...do... | 81.49 | >300 | >3.68 |
| | 2,4-dichlorophenyl | H | Cl | ...do... | 81.50 | >300 | >3.68 |
| | 4-methoxyphenyl | H | H | ...do... | ca. 125.0 | >300 | ca. >2.40 |
| | ...do... | H | H | —CH(CH₃)CH₂— | ca. 113.8 | >300 | ca. >2.64 |
| | Phenyl | CH₃CO | Cl | —(CH₂)₂— | ca. 37.9 | 100 | ca. 2.64 |
| | ...do... | CH₃CO | Cl | —(CH₂)₃— | ca. 37.9 | 100 | ca. 2.64 |
| Chlordiazepoxide | | | | | 45.10 | 100 | 2.2₃ |
| Thiazesim | | | | | (¹) | 30 | |

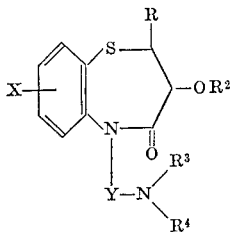

¹ Inactive.
NOTE.—The activity was evaluated 30 minutes after intraperitoneal injection of the test compound.

TABLE 3

| Test compound—Formula | R¹ | R² | X | Y | Potency ratio |
|---|---|---|---|---|---|
| (structure shown below) | 4-methylphenyl | H | H | —(CH₂)₂— | ++ |
| | 4-methoxyphenyl | H | Cl | Same | ++ |
| | ...do... | H | H | ...do... | ++ |
| | ...do... | H | H | —(CH₂)₃— | ++ |
| | ...do... | H | Cl | Same | ++ |
| | ...do... | H | H | —CH(CH₃)CH₂— | ++ |
| | Phenyl | CH₃CO | H | —(CH₂)₂— | ++ |
| | 4-methoxyphenyl | Same | H | Same | ++++ |
| | 4-methylphenyl | do | H | ...do... | +++ |
| | Phenyl | do | Cl | ...do... | ++ |
| | 4-methoxyphenyl | do | Cl | ...do... | +++ |
| | 4-chlorophenyl | do | Cl | ...do... | ++ |
| | 4-methylphenyl | do | H | —(CH₂)₃— | + |
| Thiazesim | | | | | (+)* |
| Dipyridamole | | | | | ++++ |
| Papaverine | | | | | + |

* Firstly increase coronary flow but then reverse to decrease.

What is claimed is:

1. A benzothiazepine derivative of the formula:

wherein R¹ is a phenyl group which may be substituted with 1 to 3 lower alkyl groups, lower alkoxy groups or halogen atoms, R² is a hydrogen atom or a lower alkanoyl group, R³ and R⁴ are each a lower alkyl group, X is a hydrogen atom or a halogen atom and Y is an alkylene group of 2 or 3 carbon atoms, or its non-toxic pharamaceutically acceptable acid addition salt.

2. The benzothiazepine derivative of claim 1, wherein R¹ is 4-lower alkylphenyl, R² is hydrogen, R³ and R⁴ are each lower alkyl, X is hydrogen and Y is ethylene or its non-toxic pharmaceutically acceptable acid-addition salt.

3. The benzothiazepine derivative of claim 2, wherein R¹ is 4-methylphenyl, R² is hydrogen, R³ and R⁴ are each methyl, X is hydrogen and Y is ethylene or its non-toxic pharmaceutically acceptable acid-addition salt.

4. The benzothiazepine derivative of claim 1, wherein R¹ is 4-lower alkoxyphenyl, R² is hydrogen, R³ and R⁴ are each lower alkyl, X is hydrogen and Y is ethylene or its non-toxic pharmaceutically acceptable acid-addition salt.

5. The benzothiazepine derivative of claim 1, wherein R¹ is 4-methoxyphenyl, R² is hydrogen, R³ and R⁴ are each methyl, X is hydrogen and Y is ethylene or its non-toxic pharmaceutically acceptable acid-addition salt.

6. The benzothiazepine derivative of claim 1, wherein R¹ is 4-lower alkoxyphenyl, R² is hydrogen, R³ and R⁴ are each lower alkyl, X is 7-halo and Y is ethylene or its non-toxic pharmaceutically acceptable acid-addition salt.

7. The benzothiazepine derivative of claim 6, wherein R¹ is 4-methoxyphenyl, R² is hydrogen, R³ and R⁴ are each methyl, X is 7-chloro and Y is ethylene or its non-toxic pharmaceutically acceptable acid-addition salt.

8. The benzothiazepine derivative of claim 1, wherein R¹ is 3,4-di(lower)alkoxyphenyl, R² is hydrogen, R³ and R⁴ are each lower alkyl, X is hydrogen and Y is ethylene or its non-toxic pharmaceutically acceptable acid-addition salt.

9. The benzothiazepine derivative of claim 1, wherein R¹ is 3,4-di-(lower)alkoxyphenyl, R² is hydrogen, R³ and R⁴ are each lower alkyl, X is 7-halo and Y is ethylene or its non-toxic pharmaceutically acceptable acid-addition salt.

10. The benzothiazepine derivative of claim 1, wherein R¹ is 3,4,5-tri(lower)alkoxyphenyl, R² is hydrogen, R³ and R⁴ are each lower alkyl, X is hydrogen and Y is ethylene or its non-toxic pharmaceutically acceptable acid-addition salt.

11. The benzothiazepine derivative of claim 1, wherein R¹ is 3,4,5-tri(lower)alkoxyphenyl, R² is hydrogen, R³ and R⁴ are each lower alkyl, X is 7-halo and Y is ethylene or its non-toxic pharmaceutically acceptable acid-addition salt.

12. The benzothiazepine derivative of claim 1, wherein R¹ is 4-halophenyl, R² is hydrogen, R³ and R⁴ are each 13. The benzothiazepine derivative of claim 1, wherein $R^1$ is 4-halophenyl, $R^2$ is hydrogen, $R^3$ and $R^4$ are each lower alkyl, X is 7-halo and Y is ethylene or its non-toxic pharmaceutically acceptable acid-addition salt.

14. The benzothiazepine derivative of claim 13, wherein $R^1$ is 2,4-dihalophenyl, $R^2$ is hydrogen, $R^3$ and $R^4$ are each methyl, X is 7-chloro and Y is ethylene or its non-toxic pharmaceutically acceptable acid-addition salt.

15. The benzothiazepine derivative of claim 1, wherein $R^1$ is 2-4-dihalophenyl, $R^2$ is hydrogen, $R^3$ and $R^4$ are each lower alkyl, X is hydrogen and Y is ethylene or its non-toxic pharmaceutically acceptable acid-addition salt.

16. The benzothiazepine derivative of claim 1, wherein $R^1$ is 2,4-dihalophenyl, $R^2$ is hydrogen, $R^3$ and $R^4$ are each lower alkyl, X is 7-halo and Y is ethylene or its non-toxic pharmaceutically acceptable acid-addition salt.

17. The benzothiazepine derivative of claim 16, wherein $R^1$ is 2,4-dichlorophenyl, $R^2$ is hydrogen, $R^3$ and $R^4$ are each methyl, X is 7-chloro and Y is ethylene or its non-toxic pharmaceutically acceptable acid-addition salt.

18. The benzothiazepine derivative of claim 1, wherein $R^1$ is phenyl, $R^2$ is hydrogen, $R^3$ ad $R^4$ are each lower alkyl, X is hydrogen and Y is trimethylene or its non-toxic pharmaceutically acceptable acid-addition salt.

19. The benzothiazepine derivative of claim 1, wherein $R^1$ is phenyl, $R^2$ is hydrogen, $R^3$ and $R^4$ are each lower alkyl, X is 7-halo and Y is trimethylene or its non-toxic pharmaceutically acceptable acid-addition salt.

20. The benzothiazepine derivative of claim 1, wherein $R^1$ is 4-lower alkylphenyl, $R^2$ is hydrogen, $R^3$ and $R^4$ are each lower alkyl, X is hydrogen and Y is trimethylene or its non-toxic pharmaceutically acceptable acid-addition salt.

21. The benzothiazepine derivative of claim 1, wherein $R^1$ is 4-lower alkoxyphenyl, $R^2$ is hydrogen, $R^3$ and $R^4$ are each lower alkyl, X is hydrogen and Y is trimethylene or its non-toxic pharmaceutically acceptable acid-addition salt.

22. The benzothiazepine derivative of claim 1, wherein $R^1$ is 4-lower alkoxyphenyl, $R^2$ is hydrogen, $R^3$ and $R^4$ are each lower alkyl, X is 7-halo and Y is trimethylene or its non-toxic pharmaceutically acceptable acid-addition salt.

23. The benzothiazepine derivative of claim 1, wherein $R^1$ is 4-methoxyphenyl, $R^2$ is hydrogen, $R^3$ and $R^4$ are each methyl, X is 7-chloro and Y is trimethylene or its non-toxic pharmaceutically acceptable acid-addition salt.

24. The benzothiazepine derivative of claim 1, wherein $R^1$ is 3,4,5-tri(lower)alkoxyphenyl, $R^2$ is hydrogen, $R^3$ and $R^4$ are each lower alkyl, X is hydrogen and Y is trimethylene or its non-toxic pharmaceutically acceptable acid-addition salt.

25. The benzothiazepine derivative of claim 1, wherein $R^1$ is 4-halophenyl, $R^2$ is hydrogen, $R^3$ and $R^4$ are each lower alkyl, X is 7-halo and Y is trimethylene or its non-toxic pharmaceutically acceptable acid-addition salt.

26. The benzothiazepine derivative of claim 1, wherein $R^1$ is 4-lower alkoxyphenyl, $R^2$ is hydrogen, $R^3$ and $R^4$ are each lower alkyl, X is hydrogen and Y is propylene or its non-toxic pharmaceutically acceptable acid-addition salt.

27. The benzothiazepine derivative of claim 1, wherein $R^1$ is phenyl, $R^2$ is lower alkanoyl $R^3$ and $R^4$ are each lower alkyl, X is hydrogen and Y is ethylene or its non-toxic pharmaceutically acceptable acid-addition salt.

28. The benzothiazepine derivative of claim 27, wherein $R^1$ is phenyl, $R^2$ is acetyl, $R^3$ and $R^4$ are each methyl, X is hydrogen and Y is ethylene or its non-toxic pharmaceutically acceptable acid-addition salt.

29. The benzothiazepine derivative of claim 1, wherein $R^1$ is phenyl, $R^2$ is lower alkonoyl, $R^3$ and $R^4$ are each lower alkyl, X is 7-chloro and Y is ethylene or its non-toxic pharmaceutically acceptable acid-addition salt.

30. The benzothiazepine derivative of claim 29, wherein $R^1$ is phenyl, $R^2$ is acetyl, $R^3$ and $R^4$ are each methyl, X is 7-chloro and Y is ethylene or its non-toxic pharmaceutically acceptable acid-addition salt.

31. The benzothiazepine derivative of claim 1, wherein $R^1$ is 4-lower alkylphenyl, $R^2$ is lower alkanoyl, $R^3$ and $R^4$ are each lower alkyl, X is hydrogen and Y is ethylene or its non-toxic pharmaceutically acceptable acid-addition salt.

32. The benzothiazepine derivative of claim 31, wherein $R^1$ is 4-methylphenyl, $R^2$ is acetyl, $R^3$ and $R^4$ are each methyl, X is hydrogen and Y is ethylene or its non-toxic pharmaceutically acceptable acid-addition salt.

33. The benzothiazepine derivative of claim 1, wherein $R^1$ is 4-lower alkoxyphenyl, $R^2$ is lower alkanoyl, $R^3$ and $R^4$ are each lower alkyl, X is hydrogen and Y is ethylene or its non-toxic pharmaceutically acceptable acid-addition salt.

34. The benzothiazepine derivative of claim 33, wherein $R^1$ is 4-methoxyphenyl, $R^2$ is acetyl, $R^3$ and $R^4$ are each methyl, X is hydrogen and Y is ethylene or its non-toxic pharmaceutically acceptable acid-addition salt.

35. The benzothiazepine derivative of claim 1, wherein $R^1$ is 4-lower alkoxyphenyl, $R^2$ is lower alkanoyl, $R^3$ and $R^4$ are each lower alkyl, X is 7-halo and Y is ethylene or its non-toxic pharmaceutically acceptable acid-addition salt.

36. The benzothiazepine derivative of claim 35, wherein $R^1$ is 4-methoxyphenyl, $R^2$ is acetyl, $R^3$ and $R^4$ are each methyl, X is 7-chloro and Y is ethylene or its non-toxic pharmaceutically acceptable acid-addition salt.

37. The benzothiazepine derivative of claim 1, wherein $R^1$ is 4-halophenyl, $R^2$ is lower alkanoyl, $R^3$ and $R^4$ are each lower alkyl, X is 7-halo and Y is ethylene or its non-toxic pharmaceutically acceptable acid-addition salt.

38. The benzothiazepine derivative of claim 1, wherein $R^1$ is phenyl, $R^2$ is lower alkanoyl, $R^3$ and $R^4$ are each lower alkyl, X is hydrogen and Y is trimethylene or its non-toxic pharmaceutically acceptable acid-addition salt.

39. The benzothiazepine derivative of claim 38, wherein $R^1$ is phenyl, $R^2$ is acetyl, $R^3$ and $R^4$ are each methyl, X is hydrogen and Y is trimethylene or its non-toxic pharmaceutically acceptable acid-addition salt.

40. The benzothiazepine derivative of claim 1, wherein $R^1$ is phenyl, $R^2$ is lower alkanoyl, $R^3$ and $R^4$ are each lower alkyl, X is 7-halo and Y is trimethylene or its non-toxic pharmaceutically acceptable acid-addition salt.

41. The benzothiazepine derivative of claim 1, wherein $R^1$ is 4-lower alkylphenyl, $R^2$ is lower alkanoyl, $R^3$ and $R^4$ are each lower alkyl, X is hydrogen and Y is trimethylene or its non-toxic pharmaceutically acceptable acid-addition salt.

42. The benzothiazepine derivative of claim 1, wherein $R^1$ is 4-lower alkoxyphenyl, $R^2$ is lower alkanoyl, $R^3$ and $R^4$ are each lower alkyl, X is 7-halo and Y is trimethylene or its non-toxic pharmaceutically acceptable acid-addition salt.

43. The benzothiazepine derivative of claim 42, wherein $R^1$ is 4-methoxyphenyl, $R^2$ is acetyl, $R^3$ and $R^4$ are each methyl, X is 7-chloro and Y is trimethylene or its non-toxic pharmaceutically acceptable acid-addition salt.

References Cited

UNITED STATES PATENTS

| | | | |
|---|---|---|---|
| 3,075,967 | 1/1963 | Krapcho | 260—239.3 |
| 3,429,874 | 2/1969 | Topliss | 260—239.3 |
| 3,445,458 | 5/1969 | Bell | 260—239.3 |

HENRY R. JILES, Primary Examiner

R. T. BOND, Assistant Examiner

U.S. Cl. X.R.

424—275